United States Patent [19]

Williams et al.

[11] Patent Number: 5,054,855
[45] Date of Patent: Oct. 8, 1991

[54] DETACHABLE WINDOW MOUNTABLE SEAT HEADREST

[75] Inventors: Thomas J. Williams, Elkhart; Gary D. Mills, Goshen, both of Ind.

[73] Assignee: Goshen Cushion Inc., Elkart, Ind.

[21] Appl. No.: 389,058

[22] Filed: Aug. 2, 1989

[51] Int. Cl.⁵ .............................................. A47C 7/38
[52] U.S. Cl. ...................................... 297/395; 297/391
[58] Field of Search ................ 297/391, 395; 248/467

[56] References Cited

U.S. PATENT DOCUMENTS

| | | | |
|---|---|---|---|
| 3,480,976 | 12/1969 | Yavner | 297/391 X |
| 4,030,781 | 6/1977 | Howard | 297/397 |
| 4,624,539 | 11/1986 | King et al. | 248/467 X |
| 4,770,466 | 9/1988 | Pesterfield | 297/391 |
| 4,828,287 | 5/1989 | Siler | 297/395 X |
| 4,919,483 | 4/1990 | Horkey | 297/395 |

FOREIGN PATENT DOCUMENTS

| | | | |
|---|---|---|---|
| 217661 | 3/1961 | Austria | 297/391 |
| 1477518 | 3/1967 | France | 297/395 |
| 91685 | 6/1968 | France | 297/391 |

*Primary Examiner*—Peter R. Brown

[57] ABSTRACT

A headrest which is mounted to the inside rear window of a vehicle by attached suction cups which permit the headrest to be mounted, positioned, released and repositioned to the vehicle window adjacently behind the vehicle seats.

2 Claims, 2 Drawing Sheets

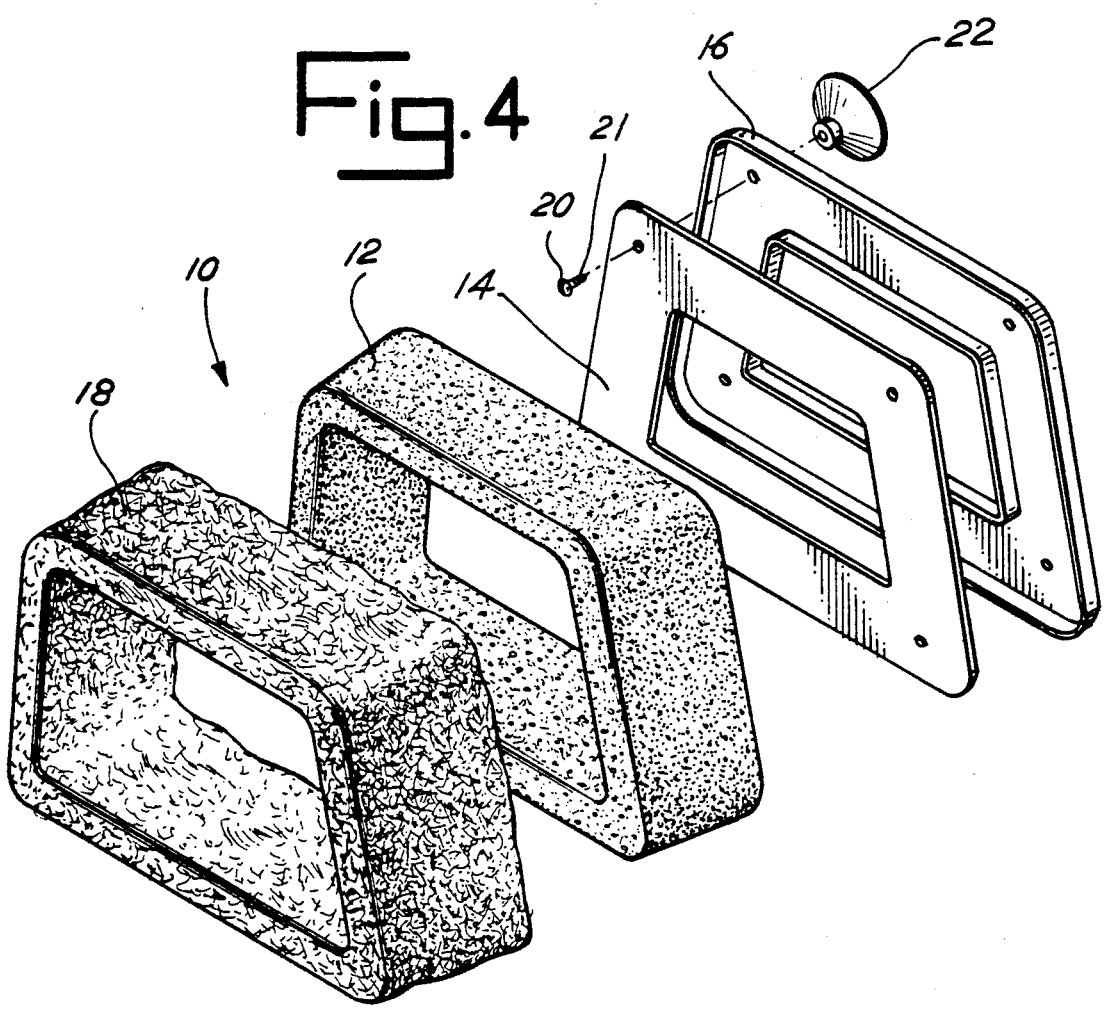

DETACHABLE WINDOW MOUNTABLE SEAT HEADREST

SUMMARY OF THE INVENTION

This invention relates to a seat headrest which may be attached to the inside rear window of a pickup truck or other vehicle behind the seat back rest.

Most pickup trucks and some other vehicles are not equipped with seat headrests. In those vehicles that have seat headrests, such headrests are attached to the vehicle seat. Suction cups are the means of attachment and adjustment of the headrest of this invention. The detachable headrest can easily be attached, released, removed, repositioned and reattached to the window of the vehicle adjacently behind the seat back to accommodate the varying desired positions of each individual passenger or driver.

Accordingly, it is an object of this invention to provide for a window mounted seat headrest.

Another object of this invention is to provide a detachable headrest which can be mounted on a vehicle window.

Another object is to provide for a detachable window headrest which can be positioned for one individual's use and then readily repositioned for another individual's use.

Other objects of this invention will become apparent upon a reading of the following description taken with the accompanying drawings.

BRIEF DESCRIPTION OF THE DRAWINGS

FIG. 4 is an exploded view of the headrest to show its component parts.

DESCRIPTION OF THE PREFERRED EMBODIMENT

The preferred embodiment herein described is not intended to be exhaustive or to limit the invention to the precise form disclosed. It is chosen and described to explain the principles of the invention and its application and practical use to enable others skilled in the art to utilize the invention.

Figure 1:
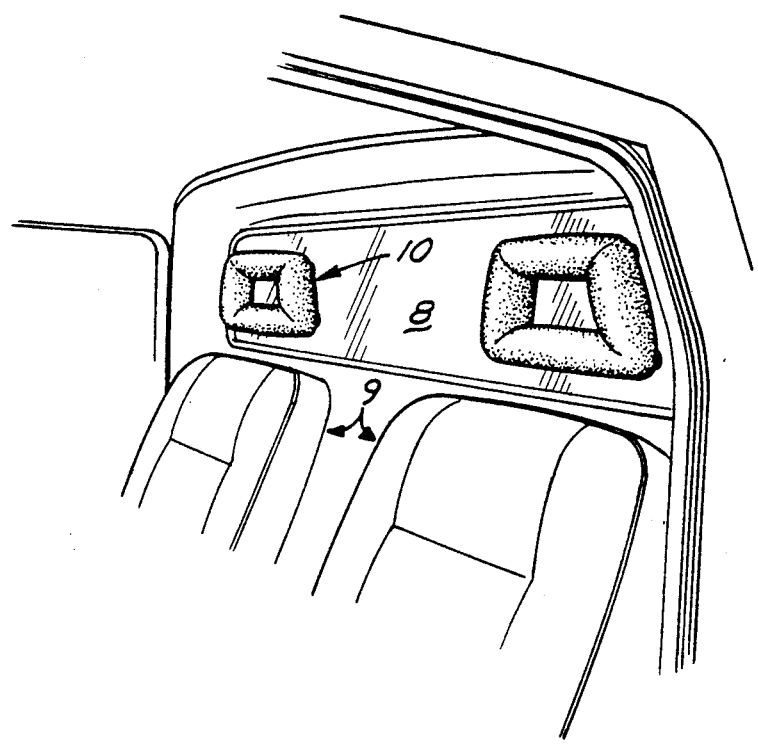
FIG. 1 is a perspective of the window mounted seat headrest of this invention shown in its attached position.
Figure 2:
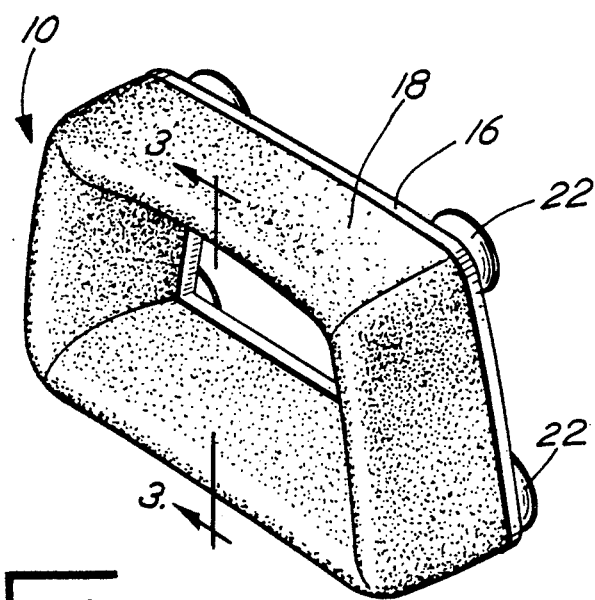
FIG. 2 is a perspective view of the headrest shown detached from the window.
Figure 3:
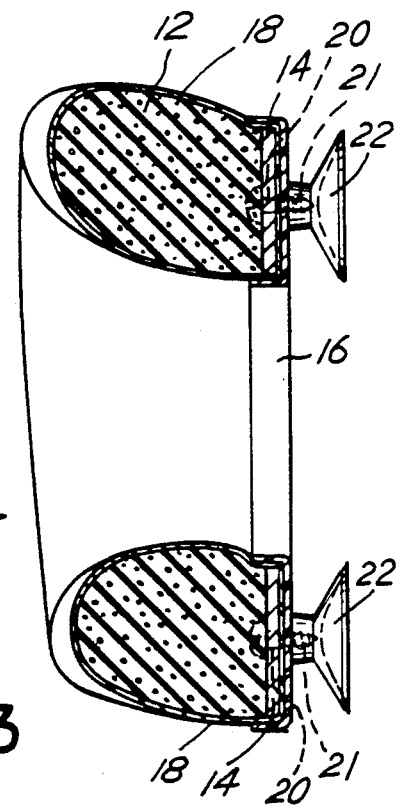
FIG. 3 is a cross-sectional view of the headrest taken along line 3—3 of FIG. 2.

With reference to the drawings, reference numeral 10 generally refers to the detachable seat headrest of this invention which is mountable on the interior surface of a rear vehicle window B shown in FIG. 1 as a part of a truck cab and located just rearwardly of seats 9.

Headrest 10 includes a generally trapezoidal-shaped cushioned support member 12. Support member 12 is preferably covered such as with a fabric 18. In some constructions, support member 12 may be formed with a textured outer skin, making the use of a covering unnecessary. Attached to the rear of support member 12 such as by an adhesive or by natural adhesion during molding of the support member is a base 14 preferably formed of wood or a similar rigid material which may also be covered by fabric 18. Backing 16 which may be formed of plastic or the like encloses base 14. Base 14 is provided with a threaded fastener 20 at each of its four corners which protrudes from the rear of the base. Fasteners 20 are normally applied before the base is joined to support member 12. The ends 21 of the fasteners 20 also protrude through backing 16. An adhesion member such as a flexible suction cup 22 is connected to each fastener 20 by being turned upon protruding end 21 of the fastener over backing 16.

The assembled window headrest 10 may be positioned and secured to vehicle window 8 by way of suction cups 22. The application is accomplished by taking the headrest 10 in the hands and firmly pressing it against vehicle window 8. To release and remove the mounted headrest 10, the suction cups 22 need only be released from the vehicle window 8.

It is understood that the headrest of this invention is not limited to the above details, but may be modified within the scope of the following claims.

I claim:

1. A headrest for a seat comprising cushioned abutment means for the head and attachment means carried by said abutment means for securing the abutment means independently of said seat to a generally planar object positioned to the rear of the seat, said attachment means being adhesion members connected to said abutment means, said abutment means having a cushioned front surface and a rear surface with said adhesion members attached to said rear surface, said abutment means including a support member having a cloth fabric covering over one side and a rigid base member at its opposite side, fasteners carried by said base member and having parts protruding from the base member, said adhesion means connected to said fastener parts, and a backing member independent of said cover applied over and enclosing said base member, said backing member forming said rear surface of said abutment means, said fasteners parts protruding from said backing member.

2. The headrest of claim 1 wherein said adhesion members are suction cups.

* * * * *